(12) United States Patent
Ng et al.

(10) Patent No.: US 6,778,938 B1
(45) Date of Patent: Aug. 17, 2004

(54) FAN SPEED DETECTION IN THE PRESENCE OF PWM SPEED CONTROL

(75) Inventors: Chungwai Benedict Ng, Mountain View, CA (US); Richard D. Henderson, Sunnyvale, CA (US); Mehmet Aslan, Milpitas, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/211,121

(22) Filed: Aug. 2, 2002

(51) Int. Cl.$^7$ .................................................. G01P 3/00
(52) U.S. Cl. ...................... 702/147; 702/145; 324/168; 318/463
(58) Field of Search ................................. 324/168, 511, 324/537; 318/463, 234, 439, 138, 271; 702/145, 147

(56) References Cited

U.S. PATENT DOCUMENTS 6,381,406 B1 * 4/2002 Smith et al. ................. 318/799
6,528,987 B1 * 3/2003 Blake et al. ................. 324/168

OTHER PUBLICATIONS

"LM78 Microprocessor System Hardware Monitor," National Semiconductor Corporation, Feb. 2000, 4 pages.
"ADM 1030 Intelligent Temperature Monitor and PWM Fan Controller," Analog Devices, Inc., 2001, 2 pages.
"ADM 1027 System Monitor and Fan Controller For Low–Noise PCs," Analog Devices, Inc., 2001, 2 pages.
"EMC6D100 EMC6D101 Environmental Monitoring and Control Device with Automatic Fan Capability," Standard Microsystems Corporation, Rev. Nov. 19, 2001, 4 pages.

* cited by examiner

*Primary Examiner*—Stephen J. Cherry
(74) *Attorney, Agent, or Firm*—Mark R. Hennings; Merchant & Gould

(57) ABSTRACT

A circuit is arranged to pulse-width modulate the duty cycle of a power supply signal that is used to control the rotational speed of a fan in a temperature-controlled system. The control system includes an edge detector for monitoring a tachometer signal that is provided by the fan. The tachometer signal is monitored at a rate (e.g., one Hertz) that is substantially lower than the rotational speed of the fan. The control system also includes a timer for recording time intervals between selected edges of a monitored tachometer signal. The fan speed is determined from the recorded time intervals. The control system extends the duty cycle of the pulse-width modulated signal to ensure that the fan power remains stable over the period in which the tachometer signal is to be monitored. Maintaining fan power ensures the validity of the tachometer signal during the period that the fan power is maintained.

26 Claims, 3 Drawing Sheets

FAN SPEED DETECTION IN THE PRESENCE OF PWM SPEED CONTROL

FIELD OF THE INVENTION

The present invention relates generally to control systems, and more particularly to detecting and controlling the speed of a pulse-width modulated fan for temperature controlled systems.

BACKGROUND OF THE INVENTION

Using pulse-width modulation (PWM) to control the rotational speed of a cooling fan is an established method for reducing the cost of a variable speed fan in a cooling system. Pulse-width modulating the power supply signal of the cooling fan can be used to vary the speed of a cooling fan. The speed of the fan is determined by the duty cycle of the power supply signal. For example, applying power having a duty cycle of 100 percent results in the fan operating at its nominally highest rate. Likewise, applying a power signal having a duty cycle of 50 percent generally results in a fan speed that is approximately half of its highest rate. A switch is used to actuate the fan by modulating the power supply. An N-type switching transistor is typically used to modulate the power supply signal because of its low cost. The N-type switching transistor is typically coupled in series between the fan motor and ground. A P-type switch, if used, would typically be coupled between the power supply and the fan.

SUMMARY OF THE INVENTION

The present invention is directed towards a control system that pulse-width modulates the duty cycle of a power supply signal that is used to control the rotational speed of a fan in a temperature-controlled system. The control system includes an edge detector for monitoring a tachometer signal that is provided by the fan. The tachometer signal is monitored at a rate (e.g., one Hertz) that is substantially lower than the rotational speed of the fan. The control system also includes a timer for recording time intervals between selected edges of a monitored tachometer signal. The speed of the fan is determined from the recorded time intervals. The control system extends the duty cycle of the pulse-width modulated signal to ensure that the fan power remains on over the period in which the tachometer signal is to be monitored. Maintaining fan power ensures the validity of the tachometer signal during the period that the fan power is maintained. The timer is also used to ensure that the pulse-width modulated signal is not extended beyond the time for which a recording of a tachometer signal for a properly operating fan can be made. This ensures that the extended PWM pulse is not long enough to substantially affect the fan speed.

A more complete appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
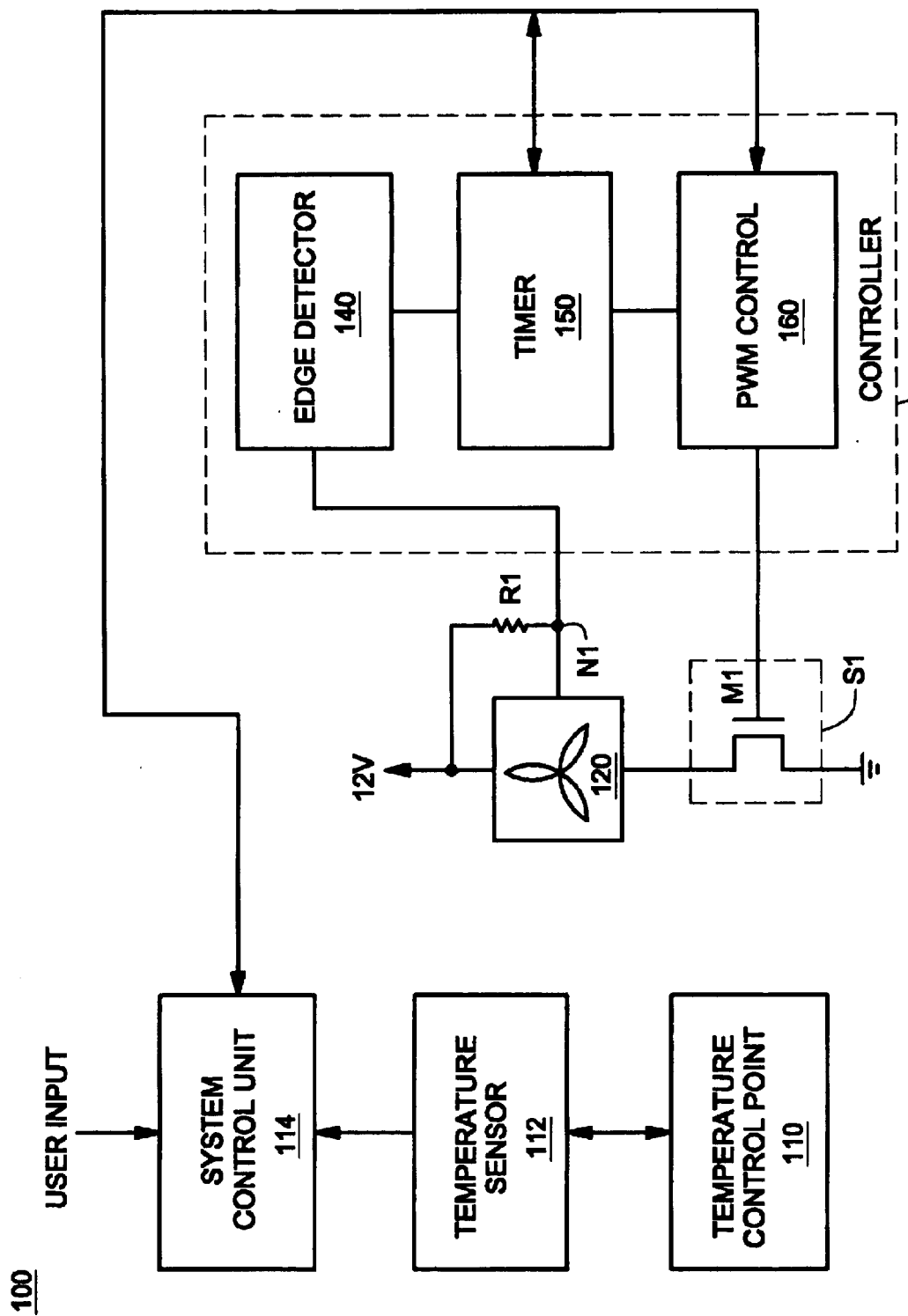
FIG. 1 is a schematic of an example of PWM fan cooling system in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed towards a control system that pulse-width modulates the duty cycle of a power supply signal that is used to control the rotational speed of a fan in a temperature-controlled system. The control system includes an edge detector for monitoring a tachometer signal that is provided by the fan. The tachometer signal is monitored at a rate (e.g., one Hertz) that is substantially lower than the rotational speed of the fan. The control system also includes a timer for recording time intervals between selected edges of a monitored tachometer signal. The speed of the fan is determined from the recorded time intervals. The control system extends the duty cycle of the pulse-width modulated signal to ensure that the fan power remains on over the period in which the tachometer signal is to be monitored. Maintaining fan power ensures the validity of the tachometer signal while the fan power is maintained. The timer is also used to ensure that the pulse-width modulated signal is not extended beyond the time for which a recording of a tachometer signal for a properly operating fan can be made. This ensures that the extended PWM pulse is not long enough to substantially affect the fan speed.

FIG. 1 is a schematic of an example of PWM fan cooling system in accordance with the present invention. As shown in the figure, system 100 includes Temperature Control Point ("TCP") 110, temperature sensor 112, System Control Unit (SCU) 114, PWM fan 120, controller 130, resistor R1, and switch S1 (e.g., transistor switch M1).

TCP 110 is a physical location that represents a point in a system for which temperature control is desired. TCP 110 may be located, for example, in an integrated circuit (such as a CPU) or other point in a system that represents the ambient temperature. Sensor 112 determines the temperature of TCP 110. Sensor 112 may be implemented as a diode in a substrate of an integrated circuit or as a stand-alone transistor. Sensor 112 may also be located at or near TCP 110, in which case it measures its own temperature. SCU 114 receives a temperature reading from sensor 112 and determines a required PWM duty cycle in response to a temperature reading or user input.

Controller 130 includes edge detector 140, timer 150, and PWM control 160. Switch S1 may be coupled between the power supply and power terminal of the fan or between a second power terminal of the fan and a ground reference of the power supply. Controller 130 may be formed by using discrete components or by using a combination of hardware and algorithms (software). Controller 130, sensor 112, SCU114 may be implemented on the same integrated circuit or on a combination of different integrated circuits. Resistor R1 is optional and may be internal or external to the fan.

Sensor 112 is coupled to SCU 114. SCU 114 is coupled to controller 130. Fan 120 has a positive power supply input that is coupled to the positive side of a power supply (providing 12 volts, for example), a tachometer signal output that is coupled to node N1, and a negative power supply input that is coupled to the first noncontrol terminal of switch S1. Resistor R1 is coupled between positive side of the power supply and node N1. Resistor R1 may also optionally be coupled to any other voltage potential. Controller 130 is coupled to node N1 and to the control terminal of switch S1. Optional signal conditioning circuitry may be coupled to node N1 for protecting circuitry such as controller 130. A second noncontrol terminal of switch S1 is coupled to the negative side of a power supply (ground, for example). Fan 120 is arranged to provide cooling for TCP 110.

SCU 114 is any suitable processing unit that operates (or cooperates) with a temperature sensor. SCU 114 may include a processor such as a microcontroller, microprocessor, state machine, combinatorial logic, a combination of these and the like. SCU 114 may include temperature sensor 112, which is arranged to provide temperature readings for TCP 110. In one embodiment, SCU 114 measures a fan speed in response to the temperature reading and communicates with controller 130 to select an appropriate fan speed control number. In another embodiment, SCU 114 measures the fan speed that results when applying a particular fan speed control number. The fan speed control number is provided to PWM control 160. PWM control 160 modulates the pulse width of the power supply signal for fan 120 by actuating switch S1. Switch S1 is actuated with a duty cycle that is determined by the fan speed control number. Longer duty cycles result in higher fan speeds, while shorter duty cycles result in lower fan speeds.

The actual fan speed is measured by the monitoring of the tachometer signal that is provided by fan 120. In an example application, determining the actual fan speed is desirable because of variations in response of fan 120 to a PWM signal that is generated according to a particular fan speed control number. SCU 114 communicates with controller 130 to provide an adjusted fan speed control number, which controls the duty ratio of the PWM signal so that a desired fan speed is achieved. As fans exist in service, a fan's speed tends to decrease as the fan ages. For example, a new fan will typically run more quickly than the same fan at a much later point in the life of the fan.

Controller 130 includes edge detector 140, timer 150, and PWM control 160. Edge detector 140 is coupled between node N1 and timer 150. Timer 150 is further coupled to SCU 114 and PWM control 160. PWM control 160 is further coupled to SCU 114 and the control terminal of switch S1.

Controller 130 includes edge detector 140 for monitoring the tachometer signal. Edge detector 140 is arranged to detect edges that are present in the tachometer signal. Edge detector 140 selectively detects falling and/or rising edges in the tachometer signal. The tachometer signal may encode the position of the motor shaft in the tachometer signal. The tachometer signal may be encoded by using sequences of long or short pulses, amplitude variations of pulses, and the like.

The speed of fan 120 can be determined by at least three different methods. The half-pulse method measures the time interval between a first edge having a first type (e.g., rising edge) and the next following edge having a type that is opposite to the first type (e.g., falling edge). The one-pulse method measures the time interval between a first edge having a first type and the next following edge having a type that is the same as the first type. The two-pulse method measures the time interval between a first edge having a first type and (skipping the next edge having the same type) a second next edge having the same type. The two-pulse method is generally more accurate than the one-pulse method, and the one-pulse method is generally more accurate than the half-pulse method. These methods can be performed as procedural steps in a microcontroller instead of being implemented using electronic circuit blocks.

Timer 150 cooperates with edge detector 140 to determine the time interval between selected edges of fan 120. In one embodiment, timer 150 selects edges according to the method desired. The temperature reading may be quantified as quantities such as a digital number or an analog voltage. Timer 150 determines the time interval from a first edge to the next selected following edge. SCU 114 can determine the speed of fan 120 by using measurements made by timer 150.

PWM control 160 provides a PWM signal to switch S1 such that the speed of fan 120 is controlled. SCU 114 provides a fan speed control number to PWM control 160, which uses the number to control the duty ratio of the PWM signal. The PWM signal controls the duty ratio of switch S1. In one embodiment, the fan speed control number is directly proportional to the duty cycle by which switch S1 is actuated. Accordingly, switch S1 alternately closes and opens such that power is alternately applied to fan 120. Fan 120 produces the tachometer signal using power from the power supply. When the power supply is removed (or, alternatively, the ground reference is removed), the tachometer signal can float, and may not produce a valid edge by which the speed of fan 120 can be determined.

SCU 114 compares the measured temperature against the desired temperature. If the measured temperature is lower than the desired temperature, SCU 114 increases the fan speed control number and sends the updated number to PWM control 160. If the measured temperature is higher than the desired temperature, SCU 114 decreases the fan speed control number and sends the updated number to PWM control 160.

Timer 150 of the present invention is configured to provide an extension signal by which the duty cycle of the PWM signal is extended until a valid determination of the fan speed can be made. Extending the duty cycle of the PWM ensures that power will not be removed from fan 120 until fan 120 can assert a valid tachometer signal. However, timer 150 is arranged to extend the duty ratio for a time period for a valid fan speed measurement over the range of valid fan speeds. For example, when a fan speed of 600 rpm is desired (which corresponds to one rotation every 100 milliseconds), the extension signal can be extended up to 50 milliseconds, if necessary. The extension signal can be increased for fans having lower speeds and can be decreased for fans having higher speeds (according to the inverse relationship of rates versus time). The fan is assumed to be not rotating if valid edges in the tachometer signal are not detected within the extended time period.

A fan may be enabled by, for example, a CPU instructing a control module to produce a PWM signal that has a selected duty ratio. The PWM signal may be used to control the duty ratio of power supply that is applied to the fan. Varying the duty ratio of the applied power can be used to control the speed of the fan.

Figure 2:
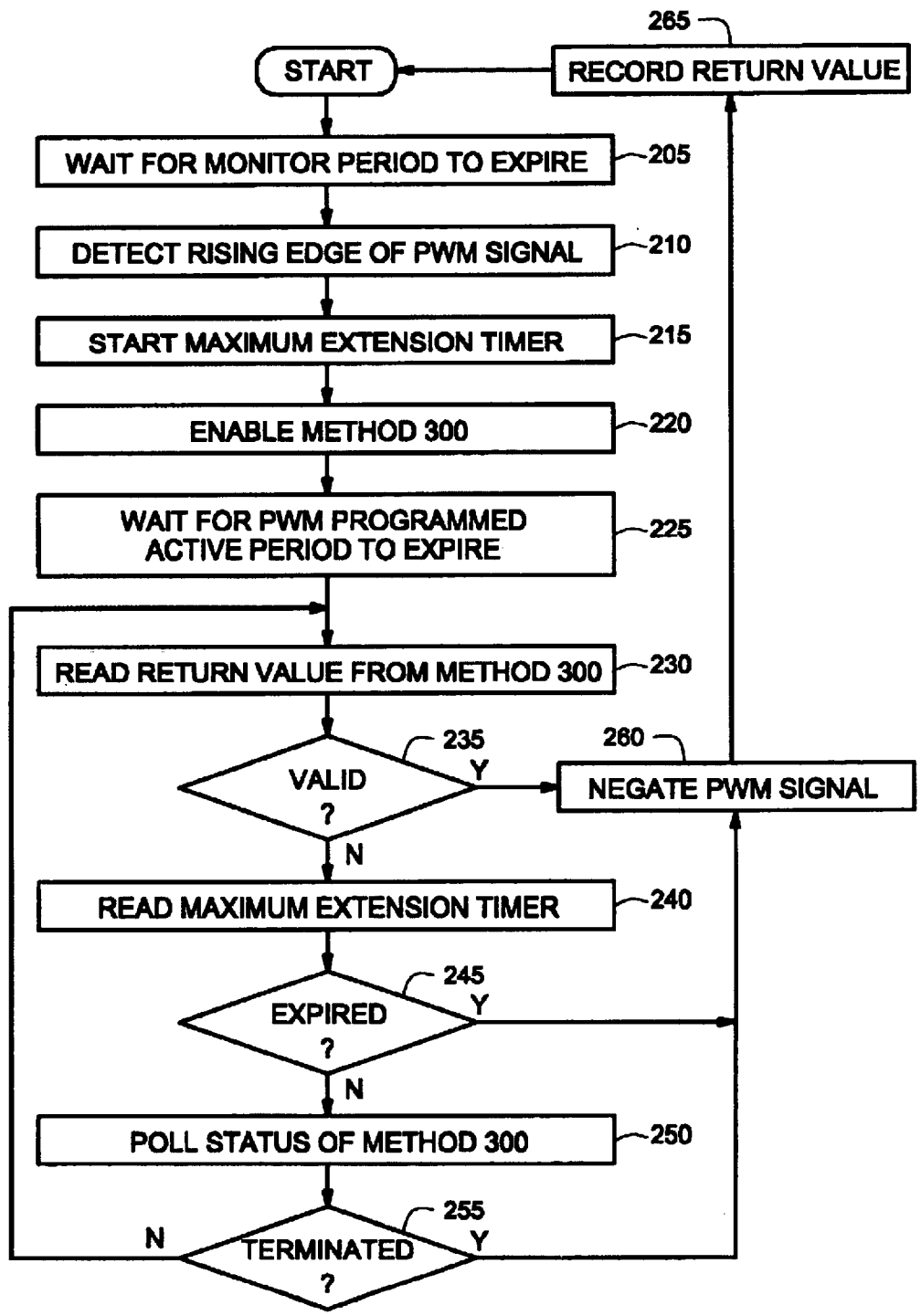
FIG. 2 is a flow diagram of a method for extending the pulse width of a pulse-width modulation signal in accordance with the present invention.

FIG. 2 is a flow diagram of a method for extending the pulse width of a pulse-width modulation signal in accordance with the present invention. Method 200 ensures that the PWM signal is active when measurements are made from the tachometer signal. Additionally method 200 invokes method 300, which contains measurement routines for the tachometer signal as discussed below.

In block 205, a monitor timer is activated that the controls the rate at which the tachometer signal is monitored. The timer (and other timers mentioned below) may be implemented as a timer, a stopwatch, a counter, and the like. The timer may be implemented in hardware, software, or a combination of hardware and software.

The tachometer signal is monitored at a rate that is substantially smaller than the rate (i.e., rpm) of the fan. A rate that is not substantially smaller is a rate that will extend the PWM signal such that the speed of the fan will be affected to such a degree where the induced error renders the technique unsuitable for its intended purpose. In one embodiment, the timer is set with a value such that the tachometer signal will be monitored approximately every second. In an example system having a nominal fan speed of 600 rpm, the tachometer signal is monitored every second. In alternative example systems, the tachometer signal can be monitored at a rate that is eight times slower than the nominal fan speed. Method 200 continues at block 210 when the monitor timer expires.

In block 210, the PWM signal is monitored until a rising edge is detected in the PWM signal. Monitoring the PWM signal is desirable because the fan will likely provide an unreliable tachometer signal if the PWM signal is low (i.e., not asserted). Monitoring the PWM signal is necessary when the tachometer is driven by a power supply that is modulated by the PWM signal.

Method 200 automatically extends, if necessary, the assertion of the PWM signal until block 260 is encountered. PWM may be extended from the end of the active period for which the PWM signal is programmed until a maximum extension time is encountered (described below with respect to block 215). When a rising edge is detected in the PWM signal, method 200 continues at block 215.

In block 215, a maximum extension timer is started. The timer is programmed with an initial value that represents the maximum length of time in which the PWM signal is to be maintained in an activated state. In an embodiment where the monitor timer is set to around one second, the maximum extension timer may be programmed with an exemplary, initial value of 50 milliseconds. A time limit of 50 milliseconds, for example, ensures that at least a half-pulse measurement can be made on a fan that is operating at a speed of 600 rpm or greater. Other embodiments may use other values depending on lowest expected speeds of fans and the type of measurement desired. The time chosen for extending the PWM pulse, should not be long enough to substantially affect the fan speed.

Maintaining the PWM signal in an active state ensures that the fan will not have power removed before a valid measurement of the tachometer signal can be made when the fan speed is in the desired measurement range. Thus, the PWM signal can be maintained in an active state for period of time longer than the active period for which the PWM signal is programmed.

In block 220, method 300 is enabled. Method 300 runs concurrently with method 200. When method 300 has been successfully enabled, method 200 continues at block 225.

In block 225, method 200 waits until a time has elapsed that is equal to the active period for which the PWM signal is programmed. When the time that is equal to be programmed active period for the PWM signal has elapsed, method 200 continues at block 230.

In block 230, the return value from method 300 is examined. The return value reflects a valid measurement if a successful measurement has been made. The return value reflects an invalid measurement if a successful measurement has not been made.

In block 235, method 200 evaluates whether a successful measurement has been made. If a successful measurement has been made, method 200 proceeds to block 260. If a successful measurement has not been made, method 200 proceeds to block 240.

In an alternate embodiment, blocks 230 and 235 are optional and method 200 may directly proceed to block 240. Proceeding to block 240, even when a valid measurement has been made, allows more time for method 300 to make a measurement using more tachometer pulses. Using more tachometer pulses to make a measurement is desirable because of the increased accuracy gained thereby.

In block 240, the current value of the maximum extension timer is read.

In block 245, method 200 evaluates whether the maximum extension timer has expired. If the timer has expired, method 200 proceeds to block 260. If the timer has not expired, method 200 proceeds to block 250.

In block 250, the status of method 300 is polled.

In block 255, the status of method 300 is evaluated. If method 300 has terminated, method 200 proceeds to block 260. If method 300 has not been terminated, method 200 returns to block 230.

In block 260, the PWM signal is negated (i.e., brought low).

In block 265, method 200 records the return value from method 300, which reflects whether a valid measurement has been made, and if so, the length of the measurement of the tachometer signal.

Method 200 continues until interrupted or halted by a supervisory process.

Figure 3:
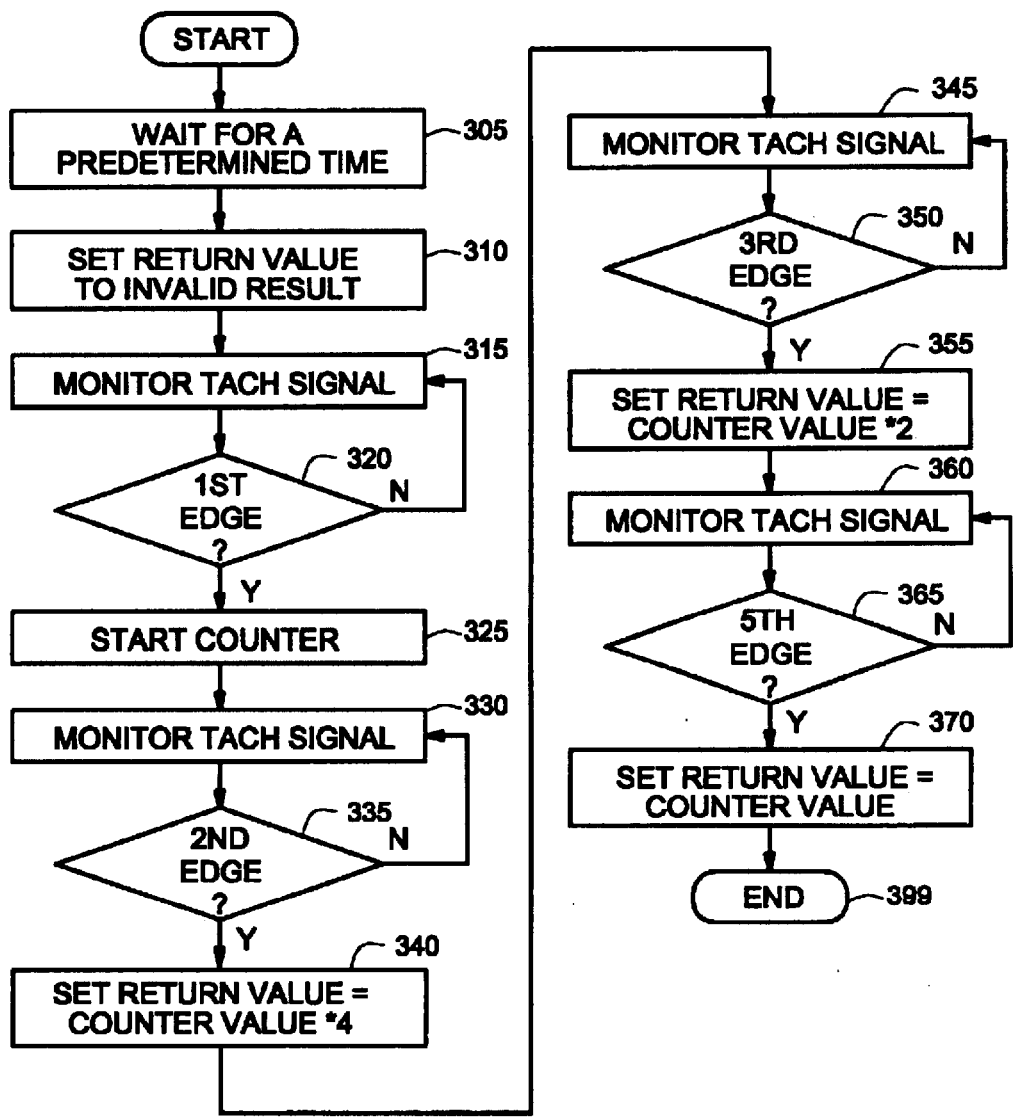
FIG. 3 is a flow diagram of a method for monitoring a tachometer signal in accordance with the present invention.

FIG. 3 is a flow diagram of a method for monitoring a tachometer signal in accordance with the present invention. Method 300 is enabled by method 200 such that methods 200 and 300 execute concurrently.

In block 305, method 300 waits for the expiration of a predetermined time period. The predetermined time period is a time that is longer than the time that is required for the tachometer signal to stabilize.

In block 310, the return value for method 300 is set to an invalid value. Initializing the return value to an invalid value provides an indication that method 300 has not yet been able to perform a valid measurement of the tachometer signal.

In block 315, the tachometer signal is monitored for an edge. In block 320, method 300 evaluates whether a first edge has been encountered. If a first edge has been encountered, method 300 proceeds to block 325. If a first edge has not been encountered, method 300 returns to block 315.

In block 325, a counter is started. A counter is used to determine the period of time between encountered edges of the tachometer signal. The counter is driven by a clock such that the value of the counter multiplied by the clock frequency yields the elapsed time.

In block 330, the tachometer signal is monitored for the next successive edge, from which a half-pulse measurement can be made. In block 335, method 300 evaluates whether a second edge has been encountered. If a second edge has been encountered, method 300 proceeds to block 340. If a second edge has not been encountered, method 300 returns to block 330.

In block 340, the return value of method 300 is set to the value of the counter multiplied by four. In one embodiment, the value of the counter is left-shifted by two bit positions to yield a value that is approximately equal to the return value of a successful two-pulse measurement.

In block 345, the tachometer signal is monitored for the next successive edge, from which a one-pulse measurement can be made. In block 350, method 300 evaluates whether a third edge has been encountered. If a third edge has been encountered, method 300 proceeds to block 355. If a third edge has not been encountered, method 300 returns to block 345.

In block 355, the return value of method 300 is set to the value of the counter multiplied by two. In one embodiment, the value of the counter is left-shifted by one bit position to yield a value that is approximately equal to the return value of a successful two-pulse measurement.

In block 360, the tachometer signal is monitored for the next two successive edges, from which a two-pulse measurement can be made. In block 365, method 300 evaluates whether a fifth edge has been encountered. If a fifth edge has been encountered, method 300 proceeds to block 370. If a fifth edge has not been encountered, method 300 returns to block 360.

In block 370, the return value of method 300 is set to the value of the counter, which indicates a successful two-pulse measurement. An SCU can use the returned value to increase or decrease the to the ratio of the PWM signal such that a desired speed for the fan can be achieved. In block 399, method 300 is terminated.

Other embodiments of the invention are possible without departing from the spirit and scope of the invention. For example, controller 130 can attempt to take fan speed measurements using additional edges, including the fourth, sixth, and other edges to accommodate one-and-a-half-pulse measurements and the like.

In another alternative, the edge detector can ensure the stability of the tachometer signal by waiting a predetermined interval after the detection of the first edge before enabling detection of the next edge in the tachometer signal.

The above specification, examples and data provide a complete description of the manufacture and use of the composition of the invention. Since many embodiments of the invention can be made without departing from the spirit and scope of the invention, the invention resides in the claims hereinafter appended.

We claim:
1. A circuit for measuring a rotational speed of a fan, comprising:
 a fan having a pulse-width modulated (PWM) power terminal that is used to control the speed of the fan;
 a switch that is coupled to the PWM power terminal; wherein the switch is configured to alternately apply and disconnect power from the PWM power terminal in response to a PWM signal;
 a tachometer that is configured to produce a tachometer signal that is proportional to the speed of the fan, wherein the tachometer is configured to produce the tachometer signal using power from the PWM power terminal;
 a PWM controller that is configured to produce the PWM signal, wherein the PWM controller is further configured to extend the active period of the duty ratio of the PWM signal for a time that is sufficient for a valid measurement of the speed of the fan to be made from the tachometer signal, whereby the speed of the fan is not substantially affected by the extension of the active period of the PWM signal; and
 and an edge detector timer that is configured to measure the time interval between a first edge of a first type of a first pulse of the tachometer signal and the next following edge of the first pulse, wherein the next following edge of the first pulse has a type that is opposite to the first type of the first edge of the first pulse, wherein the measured time interval is used to determine the speed of the fan.

2. The circuit of claim 1, wherein the PWM power terminal is coupled to a positive terminal of a power supply.

3. The circuit of claim 1, wherein the PWM power terminal is coupled to a ground terminal of a power supply.

4. The circuit of claim 1, wherein the PWM power terminal is coupled to a negative terminal of a power supply.

5. The circuit of claim 1, further comprising a temperature sensor for measuring a device that is cooled by the fan.

6. The circuit of claim 5, wherein the controller is further configured to adjust the duty ratio of the PWM signal in response a temperature measurement from the temperature sensor.

7. The circuit of claim 1, wherein the controller is further configured to adjust the duty ratio of the PWM signal in response to the measurement of the speed of the fan.

8. The circuit of claim 1, wherein the controller is further configured to periodically measure the speed of the fan wherein the rate of making the measurement is substantially slower than the speed of the fan.

9. The circuit of claim 1, wherein the controller is further configured to periodically measure the speed of the fan wherein the rate of making the measurement is at least eight times slower than the speed of the fan.

10. The circuit of claim 1, wherein the PWM controller is configured to extend the active period of the duty ratio of the PWM signal for a time that is sufficient for a half-pulse measurement to be made, wherein the active period is shorter than 50 milliseconds.

11. The circuit of claim 1, wherein the PWM controller is configured to extend the active period of the duty ratio of the PWM signal for a time that is sufficient for a two-pulse measurement to be made, wherein the active period is shorter than 50 milliseconds.

12. A circuit for measuring a rotational speed of a fan, comprising:
 means for alternately applying power to and removing power from the fan in response to a pulse-width modulated (PWM) signal;

means for producing a tachometer signal that is proportional to the speed of the fan, wherein the means for producing the tachometer signal is configured to produce the tachometer signal by using the PWM power of the fan;

means for extending the duty ratio of the PWM signal such that power remains applied to the fan for a time that is sufficient for a valid measurement of the speed of the fan to be made from the tachometer signal; and and means for measuring the time interval between a first edge of a first type and the next following edge having a type that is opposite to the first type of a pulse of the tachometer signal, wherein the measured time interval is used to determine the speed of the fan.

13. The circuit of claim 12, wherein the tachometer signal comprises pulses that are proportional to the speed of the fan.

14. The circuit of claim 13, wherein the PWM signal is extended such that at least one valid pulse is produced in the tachometer signal.

15. The circuit of claim 13, wherein the PWM signal is extended for a time that is sufficient for a half-pulse measurement to be made, wherein the active period is shorter than 50 milliseconds.

16. The circuit of claim 12, further comprising means for controlling the speed of the fan in response to a valid measurement of the speed of the fan.

17. The circuit of claim 12, further comprising means for controlling the speed of the fan in response to a temperature measurement from a device that is cooled by the fan.

18. A method for measuring a rotational speed of a fan, comprising:

alternately applying power to and removing power from the fan in response to a pulse-width modulated (PWM) signal;

producing a tachometer signal that is proportional to the speed of the fan, wherein the tachometer signal is produced using the PWM power of the fan;

extending the duty ratio of the PWM signal such that power remains applied to the fan for a time that is sufficient for a valid measurement of the speed of the fan to be made from the tachometer signal; and and measuring the time interval between a first edge of a first type and the next following edge having a type that is opposite to the first type of a pulse of the tachometer signal, wherein the measured time interval is used to determine the speed of the fan.

19. The method of claim 18, wherein the tachometer signal is produced such that the tachometer signal comprises pulses that are proportional to the speed of the fan.

20. The method of claim 19, wherein the PWM signal is extended such that at least one valid pulse is produced in the tachometer signal.

21. The method of claim 19, wherein the PWM signal is extended for a time that is sufficient for a half-pulse measurement to be made, wherein the active period is shorter than 50 milliseconds.

22. The method of claim 18, further comprising controlling the speed of the fan in response to a valid measurement of the speed of the fan.

23. The method of claim 18, further comprising controlling the speed of the fan in response to a temperature measurement from a device that is cooled by the fan.

24. The method of claim 18, further comprising periodically measuring the speed of the fan wherein the speed of the fan is measured at a rate that is substantially slower than the speed of the fan.

25. A circuit for measuring a rotational speed of a fan, comprising:

a fan having a pulse-width modulated (PWM) power terminal that is used to control the speed of the fan;

a switch that is coupled to the PWM power terminal; wherein the switch is configured to alternately apply and disconnect power from the PWM power terminal in response to a PWM signal;

a tachometer that is configured to produce a tachometer signal that is proportional to the speed of the fan, wherein the tachometer is configured to produce the tachometer signal using power from the PWM power terminal;

a PWM controller that is configured to produce the PWM signal, wherein the PWM controller is further configured to extend the active period of the duty ratio of the PWM signal for a time that is sufficient for a valid measurement of the speed of the fan to be made from the tachometer signal, whereby the speed of the fan is not substantially affected by the extension of the active period of the PWM signal; and and an edge detector timer that is configured to selectively measure the time interval between a first edge having a first type of a first pulse of the tachometer signal and a next following edge of a successive pulse, wherein the next following edge of the successive pulse has a type that is the same as the first type of the first pulse of the tachometer signal.

26. The circuit of claim 25, wherein the edge detector timer that is further configured to selectively measure the time interval between the first edge having a first type and a third edge of a third pulse that follows the next following edge of the second pulse, wherein the third edge has a type that is the same as the first type of the first pulse of the tachometer signal.

* * * * *